United States Patent [19]
Carlson et al.

[11] 3,971,745
[45] July 27, 1976

[54] AMINO TERMINATED IONIC POLYURETHANE EMULSION WITH POLYEPOXIDE EMULSION

[75] Inventors: Robert C. Carlson, Hudson, Wis.; Albert H. Stoskopf, Cottage Grove, Minn.

[73] Assignee: Minnesota Mining and Manufacturing Company, St. Paul, Minn.

[22] Filed: Dec. 21, 1973

[21] Appl. No.: 427,233

[52] U.S. Cl. .................. 260/29.2 TN; 260/830 P
[51] Int. Cl.² ................... C08J 3/24; C08K 5/15; C08L 75/08
[58] Field of Search ............. 260/29.2 TN, 830 P

[56] References Cited
UNITED STATES PATENTS

| | | | |
|---|---|---|---|
| 2,872,428 | 2/1959 | Schroeder | 260/29.2 EP |
| 3,438,940 | 4/1969 | Keberle et al. | 260/29.2 TN |
| 3,539,483 | 11/1970 | Keberle et al. | 260/29.2 TN |
| 3,622,527 | 11/1971 | Dieterich et al. | 260/29.2 TN |
| 3,663,652 | 5/1972 | Cannon et al. | 260/830 P |
| 3,756,992 | 9/1973 | Dieterich | 260/29.2 TN |
| 3,803,069 | 4/1974 | McWilliams et al. | 260/29.2 TN |

*Primary Examiner*—Murray Tillman
*Assistant Examiner*—Arthur H. Koeckert
*Attorney, Agent, or Firm*—Alexander, Sell, Steldt & DeLaHunt

[57] ABSTRACT

An aqueous polyurethane emulsion having improved wet strength properties in film form, said aqueous emulsion comprising a blend of an aqueous emulsion comprising an internally emulsified ionic polyurethane polymer with a minor amount of an aqueous emulsion comprising epoxy resin.

4 Claims, No Drawings

AMINO TERMINATED IONIC POLYURETHANE EMULSION WITH POLYEPOXIDE EMULSION

This invention relates to aqueous polyurethane emulsions, their preparation, and their use in coating or impregnation of textiles and other materials, e.g. textiles subjected to exposure to hot water such as in dyeing or laundering.

Aqueous polyurethane emulsions have known utility as coating, impregnating, or film-forming compositions. See, for example, U.S. Pat. Nos. 2,112,529 (Hazell), issued Mar. 29, 1938; 2,719,806 (Nottebohm), issued Oct. 4, 1955; 2,723,935 (Rodman), issued Nov. 15, 1955; 2,780,562 (Reinartz et al), issued Feb. 5, 1957; 3,436,303 (Raymond et al), issued Apr. 1, 1969; 3,445,272 (Newton), issued May 20, 1969; and 3,442,843, issued May 6, 1969, to Keberle et al. Aqueous emulsions of ionic, internally or self-emulsified polyurethanes are also known; see, for example, U.S. Pat. No. 3,264,134 issued Aug. 2, 1966 to Vill et al; U.S. Pat. No. 3,479,310, issued Nov. 18, 1969 to Dieterich et al; U.S. Pat. No. 3,640,924, issued Feb. 8, 1972, to Hermann et al; and British Pat. No. 1,278,426.

Films cast from many previously known polyurethane emulsions possess limited wet strength, i.e. tensile strength of such films after being soaked in water is not as great as desired for many applications. Many attempts have been made to improve the strength of urethane films cast from emulsions. For example, polyurethane dispersions useful as adhesives for laminating textile materials are disclosed in U.S. Pat. No. 3,640,924, issued Feb. 8, 1972 to Hermann et al. These adhesives are said to have exceptional strength under wet conditions, as during and after laundering, which strength is said to appear to be dependent on the breaking of the saltform of the adhesive during curing.

By way of additional background, U.S. Pat. No. 3,748,291, issued July 24, 1973 to Bakhuni et al., discloses combinations of polyurethane dispersions with epoxy resins, but the polyurethanes are not disclosed as ionic, internally emulsified polyurethanes and the combinations are not useful to provide coatings having improved wet strength.

It has now been found that aqueous polyurethane emulsions, capable of providing films having improved wet strength, can be prepared by blending an aqueous emulsion of ionic, internally emulsified polyurethane polymer with a minor amount of an aqueous emulsion comprising straight or branched chain (acyclic) aliphatic polyepoxide, e.g. polyglycidyl ether epoxy resin. The amount of said polyepoxide and the pH of the resulting blended emulsion being such as to provide a film having improved wet strength. The blended emulsion can be applied to a substrate and water removed from the applied emulsion such as by air drying at ambient or elevated temperature, application of vacuum, or the like.

The blended emulsions of the present invention provide films or coatings having improved wet strength, and otherwise possess the desirable properties one would obtain from the unmodified urethane coating.

The modified, that is, blended polyurethane emulsions of the present invention can advantageously be used for the coating or impregnation of cloth and textiles. They are useful in various textile treatments to reduce snagging and pilling of various fabrics, as well as to improve launderability and hand and are suitable for any other use where high wet film strength is desired. The emulsions of the present invention have particular utility in applications where fabric is coated with a polyurethane film and is subsequently subjected to a dyeing process. The modified emulsions of this invention can be used with advantage in the coating and manufacture of rainwear, foul weather gear, tent fabric, tarpaulins, upholstery fabrics, carpet fabrics, and the like.

The modified polyurethane emulsions of the present invention are also useful as coatings on a variety of flexible substrates including cloth, paper, leather, and wood. They may be used, for example, in beater treating processes to produce reinforced paper and synthetic sheetings, as saturants, as laminants, as leather and synthetic leather treatments such as footwear (shoe uppers, soles and heels, boots of all types), gloves, handbags, briefcases, luggage, belts, and articles of apparel as jackets and coats. Also, they can be used in textile flocking, specialty industrial flocking, belting material for all types of drive and conveyor belts, for the preparation of adhesives, and the like. The modified emulsions are also useful for hard surface applications where the properties of their films, such as good weatherability, elongation, and flexibility, in addition to their exceptional abrasion resistance, would give superior adhesion on a substrate which has a very high coefficient of thermal expansion, for example as a binder for latex paints to be used for metals, woods, plastics, etc. Other uses are for concrete and brick sealants and treatments.

The polyurethane emulsions useful as a component in preparing the blended emulsions of the present invention can be prepared by dispersing an ionic, self-emulsifiable or internally emulsifiable polyurethane polymer in water. As used herein, the term internally emulsified or emulsifiable or self-emulsified or -emulsifiable refers to polymers which have been, or are capable of being, dispersed in water to form an aqueous emulsion without the aid of additional (external) emulsifiers. This is accomplished by incorporating cationic or anionic groups, e.g. t-amino, carboxyl, or sulfonate groups, into the urethane polymer structure as a part thereof. These ionic groups impart the internal or self-emulsifying capability to the polymer. The ionic groups may be incorporated into the urethane polymer or prepolymer prior to or simultaneous with dispersion of the polymer or prepolymer in water.

Any of the known procedures, e.g. those disclosed in the patents listed in the above discussion of prior art, for preparing internally emulsified aqueous polyurethane emulsions can be used to prepare the modified emulsions of this invention. For example, emulsion polymerization can be used, using solvent free systems or alternatively, solvents may be used as is conventional, for example to provide a desired viscosity.

An anionic polyurethane emulsion, useful as a component in this invention, can be prepared using the method disclosed in British Pat. No. 1,278,426. According to this patent, a neutralized sulfonated polyurethane prepolymer solution is stirred into water, which can contain diamine, with vigorous agitation to chain extend and emulsify the prepolymers. The major part of the reaction will be over within an hour, but experience has shown that the chain extension reaction is generally not complete in less than about 24 hours, and it may be desirable to allow the freshly prepared emulsion to stand several days, before modifying it with the epoxy component, in order to obtain the desired film properties from the modified emulsions. A conventional high shear homogenizer is suitable to provide the desired degree of agitation. Polymer particles of one micron or smaller are readily obtained by this procedure and are preferred. With low shear agitation, larger polymer particle emulsions or dispersions result. Usually the amount of water used will be sufficient to provide an emulsion containing 10 to 70% by weight polyurethane solids, 25 to 50 percent being preferred, e.g. 40%. Chain extension by either water or a polyamine introduces polyurea links into the polymer chain, thus producing polyurethane-polyurea emulsions. Such emulsions are commonly referred to, however, as "polyurethane emulsions", and thus the terms are used interchangeably herein.

Polyurethane prepolymers which can be used to prepare the polyurethane emulsion component used in the present invention can be prepared by reacted polyols with polyisocyanates. Preferred polyols are usually diols or mixtures of diols, such as polyalkylene ether glycols. The polyisocyanates useful herein can be aliphatic or aromatic polyisocyanates or mixtures thereof. The mole ratio of NCO to OH groups in the reactants is preferably between 1.5:1 and 2.5:1, although other ratios in the range of about 1.2:1 to 10:1 can be used to obtain various effects. The reaction can be conveniently accomplished by heating the reactants at about 50° – 100° C. for a time sufficient to substantially complete the urethane formation and then cooling. The reaction can be accomplished with or without the aid of catalysts. Solvents may be useful to control the viscosity of the reaction mixture.

Polyoxyalkylene polyols used in preparing polyurethane prepolymers useful in the present invention have molecular weights generally ranging from about 300 to about 5,000 and preferably from about 400 to 3,000, more resilient polymers normally being obtainable from higher molecular weight polyols. Examples of polyoxyalkylene polyols are polyoxyethylene glycol, polyoxypropylene glycol, polyoxypropylene-polyoxyethylene glycol, and the like, and mixtures thereof. Polyether glycols are prepared by well known ring opening or condensation polymerization. When these polyols contain recurring oxyethylene groups, the total weight fraction of such oxyethylene groups should be controlled since the presence of a significant weight fraction of these groups tends to confer water sensitivity to the finished product. Other suitable polyols include castor oil, hydroxyl terminated polybutadiene and hydroxyl terminated vinyl polymers, preferably in the 500 – 5,000 molecular weight range. Polyoxyalkylene polyamines, polymercaptans, polycaprolactones and other compounds having 2 or more active hydrogen atoms, can also be used to prepare useful prepolymers, e.g. isocyanate-terminated polyether-urea prepolymers.

Polyester polyols may be used alone or in combination with polyether polyols in the preparation of the polyurethane polymers useful in this invention. Polyester polyols may be prepared by known methods such as by reacting dicarboxylic acids, esters or acid halides with simple glycols or higher polyols. Suitable glycols are polymethylene glycols, such as ethylene, diethylene, propylene, dipropylene, tetramethylene, decamethylene glycols, substituted polymethylene glycols, such as 2,2-dimethyl-1,3-propane diol, and cyclic glycols, such as cyclohexanediol. Polyols such as glycerine, pentaerythritol, trimethylol propane and trimethylol ethane, may be used in limited amounts to introduce chain branching into the polyester. These hydroxy compounds are reacted with aliphatic, cycloaliphatic or aromatic dicarboxylic acids or lower alkyl esters or ester forming derivatives thereof to produce polymers bearing terminal hydroxyl groups, having melting points less than about 70° C., and characterized by molecular weights in the same approximate range as for the aforementioned polyoxyalkylene glycols; generally the molecular weights are from about 400 to about 4,000, and preferably from about 1,000 to about 2,000. Examples of suitable acids are, for example, succinic, adipic, suberic, sebacic, phthalic, isophthalic, terephthalic and hexahydro terephthalic acids and the alkyl and halogen substituted derivatives of these acids.

The formation of a prepolymer can be carried out with or without solvents, although the presence of solvent may facilitate mixing and handling. Common solvents which are inert to isocyanates may be used, such as toluene an xylene.

Aromatic and aliphatic polyisocyanates, or mixtures thereof, can be used in the preparation of the polyurethane emulsion component used in the present invention. Because of their ready availability and the fact that they are liquid at room temperature, mixtures of the 2,4- and 2,6-isomers of toluene diisocyanate are especially suitable. Other useful polyisocyanates are 4,4'-diphenylmethane diisocyanate, and 3,3'-dimethyl 4,4'-diphenyl diisocyanate. Further examples of useful polyisocyanates include paraphenylene diisocyanate, metaphenylene diisocyanate, 4,4'-diphenyl diisocyanate, 1,5-naphthalene diisocyanate, 4,4'-diphenyl ether diisocyanate, 3,3'-dimethoxy 4,4'-diphenyl diisocyanate, xylylene diisocyanate, 4-chloro-1,3-phenylene diisocyanate, butane-1,4-diisocyanate, hexane-1,6-diisocyanate, dicyclohexylmethane diisocyanate, cyclohexane-1,4-diisocyanate, xylylene diisocyanate, 3-isocyanatomethyl-3,3,5,5-trimethylcyclohexyl isocyanate, 2,2,4(2,4,4)-trimethyl hexamethylene diisocyanate, methylcyclohexylene diisocyanate, polymethylene polyphenylisocyanate (PAPI), triphenyl methane triisocyanate (Mondur TM, Mobay Chemical Co.), trimethylol propane-toluene diisocyanate adduct (Mondur CB, Mobay), and mixtures thereof.

If desired, limited amounts of tri or higher polyfunctional alcohols or isocyanates may be mixed with the polyol or isocyanate to produce crosslinked polymers. Such crosslinks in the amount of about one crosslink per 50,000 or more polymer atomic weight units have only a very slight effect on the polymer properties. More than about one crosslink per 3,000 atomic weight units makes it difficult to retain good film forming characteristics. Crosslinking reduces the thermoplasticity, elongation and tear strength of the polymer and also tends to increase the modulus slightly if the polyfunctional crosslinking material is a small molecule.

Small difunctional molecules, such as diethylene glycol or diamines, may be used as chain extending agents to increase the density of polar sites in the finished polymer and thereby increase such physical properties as the modulus and tensile strength. Correspondingly the prepolymer may be partially reacted with other glycols or other difunctional or trifunctional active hydrogen containing materials in such amount that the reaction product still retains isocyanate termination. An extensive description of these prepolymers exists in Berger et al U.S. Pat. No. 3,178,310, issued Apr. 13, 1965.

The prepolymer before chain extending, or the emulsions before use, can be mixed with conventional compounding additives such as, for example fillers such as carbonates, silicates, carbon black and titanium dioxide, thickeners such as the natural gums or the polyacrylic acid salts, plasticizers, dyes, pigments, minor amounts of other compatible polymers, or agents which improve light, heat or oxidative stability.

U.S. Pat. No. 3,479,310 discloses the preparation of ionic polyurethane emulsions with t-amino and carboxylate groups incorporated into the polymer structure and such emulsions are likewise useful as the polyurethane emulsion component used in this invention.

Both cationic or anionic polyurethane emulsions are useful in the practice of the present invention since it has been found that the film properties of either of these types of emulsions can be improved by the addition of minor amounts of ionic or nonionic emulsions of polyepoxides. It is preferred that the polyepoxide emulsion component be of the same ionic character, that is, cationic or anionic, as that of the particular polyurethane emulsion component or that it be nonionic, thus assuring compatibility of the two components. Accordingly, it is preferred in the practice of this invention that anionic polyurethane emulsions are blended with anionic or nonionic epoxy emulsions, and that cationic polyurethane emulsions are blended with cationic or nonionic epoxy emulsions.

Monomeric or polymeric polyepoxide emulsions suitable for use in the present invention comprise any of the conventional polyepoxides containing more than one 1,2-epoxide (i.e. oxirane) ring,

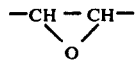

per molecule, the two carbon atoms of the epoxide ring being catenary atoms of an acyclic aliphatic chain which can be straight or branched. The epoxide rings of the polyepoxide may be in internal and/or terminal positions. The backbone structure connecting the epoxide rings may comprise aliphatic, cycloaliphatic, or aromatic constituents and may also contain hetero atoms such as oxygen, nitrogen, or sulfur.

For purposes of brevity, polyepoxide is often referred to herein as epoxy or epoxy resin. Polyepoxides having glycidyl ether groups,

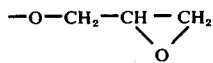

are the preferred type of polyepoxides to be used in this invention because of the commercial availability thereof. One class of polyglycidyl ether polyepoxides can be prepared by the reaction of epichlorohydrin and a polyol or polyphenol such as 2,2-bis(4-hydroxyphenyl)propane (Bisphenol A). Other common polyepoxide forming reactants useful in this invention are disclosed in the literature. See, for example, U.S. Pat. Nos. 2,840,541, 2,892,809, 2,921,049, 2,921,923, and 2,943,096, and 3,629,167. A wide variety of polyepoxide resins useful in this invention are commercially available with a wide range of epoxide equivalents, e.g. 40 to 1,000, such as those commercially available under the trademark Epon.

Many procedures for preparing epoxy emulsions are known. The preferred method is by inversion of a "water-in-oil" emulsion, i.e. a dispersion of water in the epoxy, to an "oil-in-water" emulsion, i.e. a dispersion of the epoxy in water, with the use of agitation and ionic or nonionic surfactants, including such commercially available surfactants such as the poly(oxyethylene)-poly(oxypropylene) glycol block copolymers sold under the trademark Pluronic, and the sodium salts of alkaryl polyether sulfonates sold under the trademark Triton. See, for example, Warson, H., "The Application of Synthetic Resin Emulsions", Ernest Benn Ltd., London, England (1972), pp. 256–257; and references cited therein.

The epoxy emulsions used in the present invention can be prepared by dissolving or dispersing a surfactant in the epoxy. The surfactant can be ionic or nonionic and is preferably chosen to be compatible with the ionic character of the polyurethane emulsion as noted previously. A suitable procedure comprises dissolving or dispersing an appropriate surface active agent in an epoxy resin and, while stirring the resin-containing component vigorously with a high shear mechanical mixer, adding water slowly to the resin whereby the viscosity increases until inversion occurs and an oil-in-water emulsion is obtained. Usually the amount of water used will be sufficient to provide a dispersion containing 10 to 70 percent solids by weight, although about 50 percent by weight is preferred. The amount of surfactant employed can vary and is present in an amount sufficient to provide emulsification, generally about 5 percent by weight (based on the weight of the epoxy resin). Some epoxy resins useful in the practice of this invention can be emulsified without the use of added surfactants and accordingly no added surfactant need be used under these conditions. When dissolving or dispersing the surfactant in the epoxy resins, it may be useful to heat the resin to reduce the viscosity and facilitate mixing and handling. The resulting emulsion is also rendered more stable when the epoxy resin is warmed to about 50° C. before emulsifying due to the smaller particle size then obtained. Epoxy resin solutions in which the resin is dissolved in solvents which are inert to epoxy resins, such as toluene, xylene, methyl isobutyl ketone and methyl ethyl ketone, can also be emulsified. The use of solvents may be preferable for the higher molecular weight epoxy resins to reduce viscosity and facilitate handling. The epoxy emulsions containing the larger particle sizes may settle to some extent upon standing, but they are readily redispersed with gentle agitation.

The polyurethane emulsion component can contain a single class of polyurethane polymer, e.g. polyoxyalkylene or polyester polyurethanes, or can contain mixtures of various classes. Similarly the epoxy emulsion component can also contain a single type of polyepoxide resin or a mixture of several types.

The modified polyurethane emulsions of the present invention comprise a polyurethane emulsion (free of external emulsifiers) modified with an epoxy emulsion. The amount of epoxy emulsion component used will be a minor amount sufficient to improve the wet strength of films prepared from the modified polyurethane emulsions over the wet strength of films prepared from the polyurethane emulsion component alone. Generally, a 2- to 20-fold increase in the wet strength of the films is realized. Additionally, in many cases improved strength of the dry films prepared from the modified emulsions of this invention is also obtained.

Generally, the epoxy emulsions are present in amounts ranging from 0.2 to 20 percent by weight (based on the combined weight of the polyurethane and epoxy solids) and preferably comprise between 1 to 10 percent by weight of the mixture (based on solids). The particular amount of the epoxy emulsion component to be blended in the polyurethane emulsion component will vary and generally depends upon the particular emulsion component to be used and the desired properties in the films to be made from the modified emulsions. Amounts of the epoxy emulsion component in excess of that necessary to obtain the desired strength are not generally beneficial and in some cases may be detrimental to the necessary balance of properties. For example, an excessive amount can produce a tacky film.

The epoxy emulsion can be blended with the polyurethane emulsion at any time before the blend is used. The blends are stable for long periods of time and will still exhibit desired film properties at the time of their use. To ensure that these desired film properties, notably wet strength, are obtained, the blended emulsion must have the proper pH, which will depend upon the ionic character of the polyurethane emulsion component, that is, whether it is cationic or anionic. In the case where the polyurethane emulsion component used is a cationic emulsion it, and the subsequently prepared blended emulsion, should be acidic, e.g. a pH of 1 to 5, preferably 2 to 4. This pH can be achieved by the addition of known acidic buffering agents such as phosphoric acid or tertiary amine hydrochlorides. In the case where the polyurethane emulsion component used is an anionic emulsion it, and the subsequently prepared blended emulsion, should be neutral or basic, e.g. a pH of 7 to 11, preferably 7 to 9. This pH can conveniently be achieved by the addition of common basic buffering agents such as sodium carbonate or sodium phosphate.

In some cases, small amounts of standard catalysts for homopolymerization of epoxy resins will have to be added to the blends to further improve the film properties of the blends. The use of solvent is not necessary when modifying the polyurethane emulsions with the epoxy emulsions: the two emulsions can be simply blended together. The blended emulsions of this invention have good mechanical stability, and can be readily compounded with various additives such as heat and light stabilizers, pigments and thickeners.

The blended emulsions of this invention, prepared as described hereinbefore, can be applied to the desired substrate, e.g. fabric, for example by roll or knife coating, and the applied coating or film allowed to dry. In some instances, depending on the components used in making up the blended emulsions, it may be necessary or desirable in order to obtain the desired or maximum wet strength, to age the applied coating at ambient or elevated temperatures. The best mode of achieving the desired wet strength can be determined empirically. Merely allowing the applied emulsion to dry at room temperature may be desirable, while in other cases, aging at room temperature, e.g. 10 hours to 100 days, or at elevated temperatures, e.g. up to 150° C. for 1 to 10 minutes, may be desirable. The wet strength for unheated films is generally not as good as for those which have been heated, but unheated films usually will attain similar physical properties simply by prolonged aging at room temperature. Generally aging at 65° C. for 60 minutes or about 105° C. for 5 minutes will be satisfactory to develop the desired wet strength. In general, the films, in addition to having the desired wet strength, are rubbery, homogeneous, clear, continuous and otherwise possess the desirable properties one would obtain from the unmodified urethane coating.

Fabrics coated with films formed from the modified emulsions of the present invention show improved ability to retain their strength in various water environments and are able to retain their integrity and body after processing operations involving exposure to water such as during laundering and dyeing. A formulation for a modified emulsion of this invention useful in coating fabric, such as nylon upholstery, is as follows:

| | Parts by Weight |
|---|---|
| Anionic polyurethane emulsion (Example 8) —34.2 solids | 93.6 |
| Non-ionic epoxy emulsion (Example 1(A))— 50% solids | 1.6 |
| Deionized water | 43.6 |
| Sodium carbonate | 1.2 |
| Calcium carbonate | 32.2 |
| Polyacrylate thickener —28% solids (ACRYSOL ASE-60) | 9.0 |
| Nonionic surfactant —25% solids (TERGITOL NPX, Union Carbide Corp.) | 3.0 |

The modified emulsions of the present invention can also be cast onto a release liner and the water removed to form a coherent self-supporting or free film. The cast film and release liner combination can be stored, for example in roll form, and the film subsequently stripped from the liner and bonded to a substrate with an adhesive tie coat to provide constructions having a high wet strength coating and the attendant advantages previously noted.

The invention will be further illustrated with reference to the following examples. Unless otherwise noted, all parts are by weight. Tensile and elongation values for the film prepared in the following examples were obtained using an Instron testing apparatus and the test procedures of ASTM D-412. The test films were ⅛ inch wide and the samples were elongated at a crosshead speed of 20 inches/minute (about 50 cm/min.).

EXAMPLE 1

Nonionic, anionic and cationic epoxy emulsions useful in preparing the modified emulsions of this invention were prepared in the following manner:

A. A nonionic epoxy emulsion based on epichlorohydrin and bisphenol A (Epon 828, Shell Chemical Co.) having an epoxide equivalent of 185–192, was prepared, containing 50% solids. Ten parts of a non-ionic surfactant (Pluronic P-85, Wyandotte Chemicals Corp.) was dissolved in 200 parts of epoxy resin with warming to 50° C. While stirring this mixture with a high shear mixer, 200 parts of deionized water was slowly added. The viscosity increased, inversion occurred, and an oil-in-water emulsion was obtained.

B. An anionic epoxy emulsion based on epichlorohydrin and bisphenol A (EPON 828) was prepared containing 41% solids. 16.7 parts of an anionic surfactant (Triton X-200, Rohm and Haas Co.) containing 28% solids, was dissolved in 100 parts of epoxy resin with warming to 50° C. While stirring this mixture with a high shear mixer, 138 parts of deionized water was slowly added. The viscosity increased, inversion occurred, and an oil-in-water emulsion was obtained.

C. A cationic epoxy emulsion based on epichlorohydrin and bisphenol A (EPON 828) was prepared containing 46% solids. 20 parts of a cationic surfactant (DV-673, Alcolac Chem. Corp.) containing 46% solids, was dissolved in 100 parts of epoxy resin with warming to 50° C. While stirring this mixture was a high shear mixer, 85 parts of deionized water was slowly added. The viscosity increased, inversion occurred, and an oil-in-water emulsion was obtained.

D. A nonionic epoxy emulsion based on epichlorohydrin and bisphenol A (EPON 820, Shell Chemical Co.) having an epoxide equivalent of 180–195, was prepared, containing 50% solids. 5 parts of a nonionic surfactant (Pluronic P-85) was dissolved in 95 parts of epoxy resin with warming to 50° C. While stirring this mixture with a high shear mixer, 100 parts of deionized water was slowly added. The viscosity increased, inversion occurred, and an oil-in-water emulsion was obtained E. A nonionic epoxy emulsion based on an aliphatic modification of epichlorohydrin and bisphenol A (EPON 871, Shell Chemical Co.) having an epoxide equivalent of 390–470, was prepared, containing 50% solids. 5 parts of a nonionic surfactant (Pluronic P-85) was dissolved in 95 parts of epoxy resin with warming to 50° C. While stirring this mixture with a high shear mixer, 100 parts of deionized water was slowly added. The viscosity increased, inversion occurred, and an oil-in-water emulsion was obtained.

F. A polyglycidyl methacrylate: butyl acrylate copolymer emulsion was prepared by reacting 210 parts of deionized water and 32.1 parts of an anionic surfactant (Triton X-200, 28% solids), with 45 parts of glycidyl methacrylate and 45 parts of n-butyl acrylate. After heating to 65° C., 0.45 parts of azobisisobutyronitrile (E. I. duPont de Nemours & Co., Inc.) was added and the reaction heated at 75° C. for one hour. The mixture was cooled and filtered through cheesecloth. An anionic oil-in-water epoxy emulsion having an epoxy equivalent of 316 and 29% solids was obtained.

EXAMPLE 2

A polyether-polyurethane prepolymer was prepared by reacting 476 parts of 1,000 average molecular weight polyoxypropylene glycol (PPG 1025, Wyandotte Chemicals Corp.) with 169 parts of toluene diisocyanate (80/20 mixtures, by weight, of 2,4-/2,6-isomers) and 0.19 parts of stannous octoate (Catalyst T-9, Metal & Thermit Corp.) at 65° C. for 2 hours, to an isocyanate equivalent weight of 687. 13.7 Parts of methyl diethanol amine was added at 40° C. and a slight exotherm observed. The prepolymer was emulsified and chain extended using a high shear mixer by adding the prepolymer to 1,336 parts of deionized water containing 34.4 parts of acetic acid. The freshly prepared emulsion of the cationic polyether-polyurethane polymer was allowed to stand for several days. The solids content was found to be 29.8%.

A control film 23.0 – 29.4 mils thick (when dried) was prepared by pouring a small portion of emulsion into a petri dish and allowing the film to air dry at room temperature (about 25° C.) The air dried film was then heated at 65° C. for 60 minutes and 104° C. for 5 minutes. After soaking in water for at least 16 hours, the control film had a wet film tensile strength of 16.2 kg/cm$^2$.

Another portion (40 parts) of the cationic emulsion was modified by blending therewith 0.815 parts of nonionic epoxy emulsion prepared from Epon 828 in Example 1A. A film of 21.6 – 26.2 mils thickness was prepared from the blend conditioned and tested by the same procedure as for the control film above. The film prepared from the modified emulsion had a wet film tensile strength of 38.1 kg/cm$^2$, a two-fold increase over the tensile strength of the control film.

EXAMPLE 3

A polyether-polyurethane prepolymer was prepared by reacting 476 parts of 1,000 average molecular weight polyoxypropylene glycol (PPG 1025) with 169 parts of toluene diisocyanate (80/20 mixtures, by weight, of 2,4-/2,6-isomers) at 65° C. for 2½ hours to an isocyanate equivalent weight of 664. 6.1 parts of 100% H$_2$SO$_4$ was added and reacted at 65° C. for 30 minutes. Then the prepolymer was diluted with 262 parts of methyl ethyl ketone. The prepolymer solution was emulsified and chain extended using a high shear mixer by adding it to 1175 parts of deionized water containing 3.56 parts of Na$_2$CO$_3$ to produce a stable emulsion. The freshly prepared emulsion of the anionic polyether-polyurethane polymer was allowed to stand for several days and the solids content was found to be 31%.

A control film 18.0 – 19.5 mils thick (when dried) was prepared by pouring a small portion of emulsion into a petri dish and allowing the emulsion to air dry at room temperature. The air dried film was then heated at 65° C. for 60 minutes and 104° C. for 5 minutes. After soaking in water for at least 16 hours, the control film had a wet film tensile strength 4.2 kg/cm$^2$.

Another portion (50 parts) of the anionic emulsion was modified by blending therewith 0.62 parts of nonionic epoxy emulsion prepared frm EPON 828 in Example 1 (A) and 0.31 parts of 2,4,6-tris (dimethylaminomethyl phenol). A film 15.3 – 19.0 mils thick was prepared from the blend, conditioned and tested by the same procedure as for the control film. The film prepared from the modified emulsion had a wet film tensile strength of 12.7 kg/cm$^2$, a three-fold increase over the tensile strength of the control film.

EXAMPLE 4

A polyether-polyurethane prepolymer was prepared by reacting 983.5 parts of 2,000 average molecular weight polyoxypropylene glycol (PPG 2025, Wyandotte Chemicals Corp.) and 34.8 parts of polyoxypropylene triol having an average molecular weight of 424 (TP 440, Wyandotte Chemicals Corp.) with 186.2 parts of toluene diisocyanate (80/20 mixtures, by weight, of 2,4-/2,6-isomers) and 0.3 parts of T-9 stannous octoate at 65° C. for 2 hours, to an isocyanate equivalent weight of 1,360. 291.5 parts of the above prepolymer was heated at 55° C. for one hour with 6.6 parts of methyl diethanol amine. The resulting chain-extended prepolymer was then diluted with 129 parts of toluene and the resulting prepolymer solution was emulsified and further chain extended, using a high shear mixer, by adding it to 585 parts of deionized water containing 5.5 parts of acetic acid. Following emulsification, 8.5 parts of 3-isocyanatomethyl-3,5,5-trimethylcyclohexyl isocyanate dissolved in 25 parts of toluene was added to the emulsion and dispersed with the high shear mixer. The freshly prepared cationic polyether-polyurethane emulsion was allowed to stand for several days: the solids content was found to be 29%.

A control film 22.8 – 26.9 mils thick (when dried) was prepared by pouring a small portion of emulsion into a petri dish and allowing the emulsion to air dry at room temperature. The air dried film was then heated at 65° C. for 60 minutes and 104° C. for 5 minutes. After soaking in water for at least 16 hours, the control film had a wet film tensile strength of 5.8 kg/cm$^2$.

Another portion (50 parts) of the cationic emulsion was modified by blending therewith 0.58 parts of nonionic epoxy emulsion, prepared from EPON 828 in Example 1 (A). A film 22.8 – 29.0 mils thick was prepared from the blend, conditioned and tested by the same procedure as for the control film. The film prepared from the modified emulsion had a wet film tensile strength of 41.2 kg/cm$^2$, a seven-fold increase over the tensile strength of the control film.

EXAMPLE 5

A polyester-polyurethane prepolymer was prepared by reacting 2466 parts of 822 average molecular weight polycaprolactone polyol (NIAX D-520, Union Carbide Corp.) with 1,500 parts of diphenyl methane-4,4'-diisocyanate, and heated at 65° C. for 5 hours, to an isocyanate equivalent weight of 650. The prepolymer was diluted with 441 parts of toluene. 15 parts of bis(hydroxymethyl) propionic acid, 11.3 parts of triethyl amine, and 240.7 parts of methyl ethyl ketone were premixed, and added to 333 parts of the above prepolymer solution. The resulting anionic prepolymer was then emulsified and chain extended, using a high shear mixer by adding the prepolymer to 600 parts of deionized water. Some coagulum developed while standing for 3 days. This was removed by filtering through cheesecloth, and the resulting emulsion of anionic polyester-polyurethane polymer was then heated 16 hours at 65° C. after which the solvent was removed under reduced pressure, the heated emulsion having a solids content of 35.7%.

A control film 23.1 – 24.7 mils thick (when dried) was prepared by pouring a small portion of emulsion into a petri dish and allowing the emulsion to air dry at room temperature. The air dried film was then heated at 65° C. for 60 minutes and 104° C. for 5 minutes. After soaking in water for at least 16 hours, the control film had a wet film tensile strength of 37.5 kg/cm$^2$.

Another portion (45 parts) of the anionic emulsion was modified by blending therewith 2.56 parts of nonionic epoxy emulsion, prepared from Epon 828 in Example 1 (A). A film of 21.0 – 23.2 mils thickness was prepared from the blend, conditioned and tested by the same procedure as for the control film. The film prepared from the modified emulsion had a wet film tensile strength of 119.6 kg/cm$^2$, a three-fold increase over the tensile strength of the control film.

EXAMPLE 6

A polyether-polyurethane prepolymer was prepared by reacting 1,473 parts of 1,000 average molecular weight polyoxypropylene glycol (PPG 1025) with 786 parts of methyl bis-cyclohexylisocyanate and 0.74 parts of T-9 stannous octoate, and then heating at 65° C. for 3½ hours, to an isocyanate equivalent weight of 803. This prepolymer was diluted with 251 parts of toluene to provide a prepolymer solution. 15 Parts of bis(hydroxymethyl) propionic acid, 11.3 parts of triethyl amine, and 240.7 parts of methyl ethyl ketone were premixed, and added to 333 parts of the above prepolymer solution. The resulting anionic prepolymer was then emulsified and chain extended using a high shear mixer, by adding the prepolymer to 600 parts of deionized water. After several days, 200 parts of this emulsion was further diluted with 100 parts of deionized water and heated at 65° C. for 16 hours. The resulting diluted emulsion had a solids content of 12.5%.

A control film 24.3 – 25.0 mils thick (when dried) was prepared by pouring a small portion of emulsion into a petri dish and allowing the emulsion to air dry at room temperature. The air dried film was then heated at 65° C. for 60 minutes and 104° C. for 5 minutes. After soaking in water for at least 16 hours, the control film had a wet film tensile strength of 3.0 kg/cm$^2$.

Another portion (90 parts) of the anionic emulsion was modified by blending therewith 1.8 parts of nonionic epoxy emulsion prepared from EPON 828 in Example 1(A). A film 16.6 – 22.8 mils thick was prepared from the blend, conditioned and tested by the same procedure as for the control film. The film prepared from the modified emulsion had a wet film tensile strength of 13.9 kg/cm$^2$, a four-fold increase over the tensile strength of the control film.

EXAMPLE 7

A polyether-polyurethane prepolymer was prepared by reacting 2,460 parts of 1,000 average molecular weight polyoxypropylene glycol (PPG 1025) with 940 parts of xylylene diisocyanate at 85° C. for 8 hours, to an isocyanate equivalent of 767. 9 Parts of bis(hydroxymethyl) propionic acid, 6.8 parts of triethyl amine, and 150 parts of methyl ethyl ketone were premixed, and added to 300 parts of the above prepolymer, and heated at 65° C. for 3 hours. The resulting anionic prepolymer was then emulsified and chain extended using a high shear mixer, by adding the prepolymer to 600 parts of deionized water. After several days, the emulsion was filtered through cheesecloth and then heated at 65° C. for 96 hours. The resulting emulsion of anionic polyether-polyurethane polymer had a solids content of 38.6%.

A control film 21.1 – 31.7 mils thick (when dried) was prepared by pouring a small portion of emulsion into a petri dish and allowing the emulsion to air dry at room temperature. The air dried film was then heated at 65 C. for 60 minutes and 104° C. for 5 minutes. After soaking in water for at least 16 hours, the control film had a wet film tensile strength of 3.9 kg/cm$^2$.

Another portion (50 parts) of the anionic emulsion was modified by blending therewith 0.78 parts of nonionic epoxy emulsion, prepared from EPON 828 in Example 1(A). A film 14.8 – 27.4 mils thick was prepared from the blend, conditioned and tested by the same procedure as for the control film. The film prepared from the modified emulsion had a wet film tensile strength of 26.6 kg/cm$^2$, a six-fold increase over the tensile strength of the control film.

EXAMPLE 8

A polyether-polyurethane prepolymer was prepared by reacting 952 parts of 2,000 average molecular weight polyoxypropylene glycol (PPG 2025), and 34.2 parts of polyoxypropylene triol having an average molecular weight of 424 (TP 440) with 183 parts of toluene diisocyanate (80/20 mixtures, by weight, of 2,4-/2,6-isomers) and 0.13 parts of T-9 stannous octoate at 65° C. for 2 hours, to an isocyanate equivalent weight of 1,299. To the above prepolymer, 11.4 parts 100% H$_2$SO$_4$ were added, the temperature increasing to 73° C. While at the latter temperature, 33.3 parts of 3-isocyanato-methyl-3,5,5-trimethylcyclohexyl isocyanate were added to the sulfonated prepolymer, and the temperature of the resulting mixture maintained at 73° C. for ½ hour. The resulting mixture was then diluted with 425 parts of methyl ethyl ketone. 788 Parts of the resulting prepolymer solution was emulsified and chain extended, using a high shear mixer, by adding the prepolymer solution of 1,177 parts of deionized water containing 3.4 parts of sodium carbonate. The freshly prepared anionic polyether-polyurethane emulsion was allowed to stand for several days and the solids content was found to be 34.2%.

A control film 21.4 – 21.7 mils thick (when dried) was prepared by pouring a small portion of emulsion into a petri dish and allowing the emulsion to air dry at room temperature. The air dried film was then heated at 65° C. for 60 minutes and 104° C. for 5 minutes. After soaking in water for at least 16 hours, the control film had a wet film tensile strength of 5.2 kg/cm$^2$.

Another portion (75 parts) of the anionic emulsion was modified, by blending therewith with 1.2 parts of nonionic epoxy emulsion, prepared from Epon 828 in Example 1(A). A film 16.5 – 20.7 mil thick was prepared from the blend, conditioned and tested by the same procedure as for the control film. The modified film had a wet film tensile strength of 11.1 kg/cm$^2$.

What is claimed is:
1. An aqueous emulsion comprising a blend of
   a. polyurethane emulsion comprising 10 to 70 percent by weight internally emulsified, ionic polyurethane polymer containing terminal amino groups, and
   b. polyepoxide emulsion comprising 10 to 70 percent by weight polyglycidylether polyepoxide resin, said polyepoxide resin being present in an amount of 1 to 10 percent by weight, based on the combined weight of the polyurethane and polyepoxide resin solids, said aqueous emulsion having a suitable pH and said amount of said polyepoxide resin and said pH being such as to provide a dry film from said aqueous emulsion having improved wet strength.
2. An aqueous emulsion according to claim 1 wherein said polyurethane polymer is anionic and said polyepoxide emulsion is nonionic.
3. An aqueous emulsion according to claim 2, wherein said polyurethane polymer is a polyoxypropylene polyurethane and said polyepoxide resin is diglycidyl ether of 2,2-bis(4-hydroxyphenyl) propane.
4. An aqueous emulsion comprising a blend of
   a. aqueous polyurethane emulsion comprising internally emulsified, ionic polyurethane polymer containing terminal amino groups, and
   b. aqueous polyepoxide emulsion comprising polyepoxide resin containing more than one 1,2-epoxide ring per molecule, the two carbon atoms of the epoxide ring being catenary atoms of an acyclic aliphatic chain which can be straight or branched, said polyepoxide resin being present in an amount of 1 to 10 percent by weight, based on the combined weight of the polyurethane and polyepoxide resin solids, said aqueous blend having a suitable pH and the amount of said polyepoxide resin and said pH being such as to provide from said blend a dry film having improved wet strength.

\* \* \* \* \*